Sept. 25, 1934.   H. MARLES   1,974,781
WORM GEAR ADJUSTMENT FOR STEERING GEARS
Filed April 15, 1933
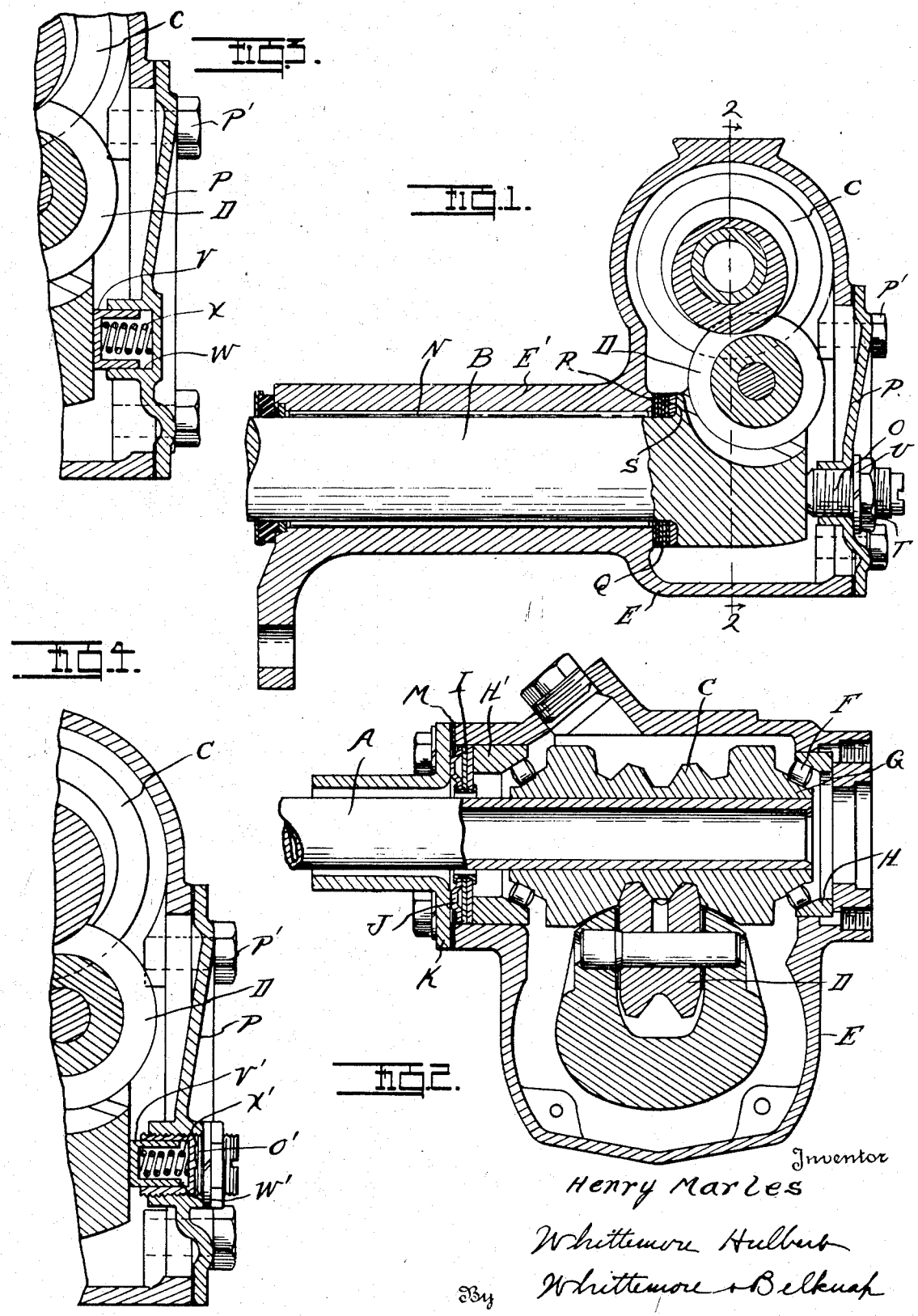
Inventor
Henry Marles
By Whittemore Hulbert
Whittemore & Belknap
Attorneys Patented Sept. 25, 1934

1,974,781

UNITED STATES PATENT OFFICE 1,974,781

WORM GEAR ADJUSTMENT FOR STEERING GEARS

Henry Marles, Detroit, Mich., assignor to Gemmer Manufacturing Company, Detroit, Mich., a corporation of Michigan Application April 15, 1933, Serial No. 666,369

8 Claims. (Cl. 74—79)

The invention relates to steering gears of that type in which the gear of the worm gearing between the steering stem and the rock shaft is provided with a roller tooth. It is the object of the present invention to obtain a construction of this type which has a simple means of adjustment through which all lost motion between the worm and the gear may be taken up. To this end the invention consists in the construction as hereinafter set forth.

In the drawing:

Fig. 1 is a section through the housing for the worm gearing taken in the plane of the axis of the rock shaft;

Fig. 2 is a cross section on line 2—2 of Fig. 1;

Figs. 3 and 4 are views similar to a portion of Fig. 1 showing modified constructions.

As illustrated, A is the rotary steering stem of a motor vehicle steering mechanism, B is the rock shaft to be actuated thereby, C is a worm mounted on the stem A; D is a roller mounted on the rock shaft B fashioned to form teeth for engaging with the worm, and E is a housing in which the gearing is enclosed. It is usual with such constructions to form the engagement between the worm and the worm gear in the plane of the axis of the steering stem which is perpendicular to the axis of the rock shaft. With such an arrangement provision must be made for adjusting the axis either of the worm or the rock shaft, so as to properly set the teeth of the gear in engagement with the worm. With my improved construction I have avoided such complication by offsetting the plane of engagement between the worm and the gear from that plane of the axis of the worm which is perpendicular to the axis of the rock shaft. This permits of adjusting the gear radially with respect to the worm by an axial movement of the rock shaft.

The bearings for the worm are preferably formed by rollers F which are arranged between conical race members G and opposite ends of the worm and preferably integral therewith, and annular race members H seated in the housing E. One of these race members H' is axially slidable in the housing E and is resiliently pressed against the rollers G by one or more dished washers I. These washers together with a backing washer J are held in position by an end cap member K which is secured to the casing E by bolts L. Shims M may be placed between the cap member K and casing E for purposes of adjustment. The rock shaft B is journaled in a sleeve bearing portion E' of the housing E, being preferably provided with needle roller bearings N arranged between this sleeve and the shaft. Axial adjustment of the shaft is accomplished by a screw O engaging a threaded bearing in a cap member P which closes the opening through which the worm and shaft are introduced into the casing E. This screw O bears against the end of the shaft B and to provide for adjustment a series of shims Q are arranged between shoulders R and S respectively on the housing E and shaft B. Thus the position of the shaft may be altered by either adding or removing the shims Q, thereby permitting an adjustment of the roller tooth D into engagement with the worm C.

With the construction as described, the axes of the worm C and shaft B are so positioned that the roller D will come into full engagement with the worm when its axis is offset from the plane 2—2. This permits of adjustment by adding or taking away shims Q and then adjusting the screw O so as to bear against the end of the shaft B. It also permits of adjustment to compensate for wear by removing one or more shims Q and readjusting the screw O. When properly adjusted, the screw O is locked from displacement by a nut T and lock washer U, thereby holding the shaft B from axial movement in either direction. In the same way adjustment can be made for the worm C by adding or removing shims M. However, the dished washers I will introduce a slight resiliency so that all endwise lost motion is taken up without danger of any binding or abnormal pressure upon the rolls G.

By dispensing with any adjustment of the axes of the worm shaft towards or from each other, the construction is simplified and this also dispenses with the necessity of holding the manufacturer to close tolerances. Thus slight errors in the manufacture of the casing altering the distance between the axes of the worm and the shaft when mounted therein, will be compensated for by a slight axial adjustment of the shaft and the introduction or removal of the shims Q. The removable cover P for the housing E is secured in position by screws P' without any necessity of accurate workmanship, for the adjustable screw O will compensate for any slight errors. Thus the whole structure is one which can be cheaply manufactured and easily assembled and adjusted.

If it is desired to provide automatic means for taking up all lost motion between the roller tooth and the worm, I may employ the construction shown in Fig. 3 in which in place of the adjustable screw O, I insert a hollow bearing block V in a recess W in the cover plate P, together with a spring X for yieldably forcing said block towards the end of the rock shaft. In Fig. 4 a bearing block V' and spring X' are used similar to the construction of Fig. 3, but these parts are placed in a recess W' in an adjustable screw O'. This construction permits of both manual and automatic adjustment.

What I claim as my invention is:

1. In a steering gear, the combination of a worm, a rock shaft and a mounting for said worm and rock shaft with the axes thereof extending transversely in fixed relation to each other, a roller tooth mounted on said rock shaft with its axis substantially parallel to the axis of the worm but in a plane offset from that axial plane of said worm which is perpendicular to the axis of the rock shaft opposite end thrust bearings respectively on said rock shaft and mounting, shims between said bearings, and means for axially adjusting said rock shaft against said shims to effect a radial adjustment of said roller tooth with respect to said worm.

2. In a steering gear, the combination of a worm, a rock shaft and a mounting for said worm and rock shaft with the axes thereof extending transversely in fixed relation to each other, a roller tooth mounted on said rock shaft with its axis substantially parallel to the axis of the worm but in a plane offset from that axial plane of said worm which is perpendicular to the axis of the rock shaft opposite end thrust bearings respectively on said rock shaft and mounting, shims between said bearings, and an adjustable end thrust bearing for said rock shaft adapted to effect a radial adjustment of said roller tooth relative to said worm.

3. In a steering gear, the combination of a worm and a rock shaft, a housing for enclosing the same, roller bearings in said housing for said worm and rock shaft holding the axes thereof in fixed relation to each other, a roller tooth mounted on said rock shaft with its axis substantially parallel to the axis of the worm but positioned to engage said worm in a plane offset from that axial plane of said worm which is perpendicular to the axis of the rock shaft, opposed end thrust bearings respectively on said rock shaft and housing, shims between said bearings for axially adjusting said rock shaft, and an adjustable bearing in said housing engaging the end of said rock shaft to hold the shoulder thereof against said shims.

4. In a steering gear, the combination of a worm, a rock shaft, a housing for enclosing the same provided with journal bearings therefor with their axes extending in transverse directions and in fixed relation to each other, said housing being apertured for the endwise introduction of said rock shaft into its bearing, a roller tooth mounted on said rock shaft with its axis substantially parallel to the axis of the worm and positioned to engage said worm in a plane laterally off-set from that axial plane of the worm which is perpendicular to the axis of said rock shaft opposite end thrust bearings respectively on said rock shaft and mounting, shims between said bearings, a cover for closing the aperture in said housing, and an adjustable member having a threaded engagement with said cover bearing against the end of said rock shaft whereby said rock shaft may be axially adjusted by said member against said shims to effect a radial adjustment of said roller tooth with respect to said worm.

5. In a steering gear, the combination of a worm, a rock shaft and a mounting for said worm and rock shaft with the axes thereof extending transversely in fixed relation to each other, of a roller tooth mounted on said rock shaft with its axis substantially parallel to the axis of the worm but in a plane offset from that axial plane of said worm which is perpendicular to the axis of the rock shaft opposite end thrust bearing respectively on said rock shaft and mounting, shims between said bearings, and means for automatically adjusting said rock shaft axially to effect a radial adjustment of said roller tooth into contact with said worm.

6. In a steering gear, the combination of a worm, a rock shaft and a mounting for said worm and rock shaft with the axes thereof extending transversely in fixed relation to each other, of a roller tooth mounted on said rock shaft with its axis substantially parallel to the axis of the worm but in a plane offset from that axial plane of said worm which is perpendicular to the axis of the rock shaft opposite end thrust bearings respectively on said rock shaft and mounting, shims between said bearings, an adjustable thrust bearing for said rock shaft adapted to effect a radial adjustment of said roller tooth relative to said worm, and resilient means for automatically adjusting said bearing to take up wear or lost motion between said roller and worm.

7. In a steering gear, the combination of a worm, a rock shaft and a mounting for said worm and rock shaft with the axes thereof extending transversely in fixed relation to each other, of a roller tooth mounted on said rock shaft with its axis parallel to the axis of the worm but in a plane offset from that axial plane of said worm which is perpendicular to the axis of the rock shaft opposite end thrust bearings respectively on said rock shaft and mounting, shims between said bearings, a thrust bearing slidably engaging a recess in said housing and bearing against the end of said rock shaft, and a spring within said recess for yieldably forcing said bearing against said rock shaft.

8. In a steering gear, the combination of a worm, a rock shaft, a housing for enclosing the same provided with journal bearings therefor to hold the axes thereof in fixed relation to each other, said housing being apertured for the endwise introduction of said rock shaft into its bearing, a roller tooth mounted on said rock shaft with its axis parallel to the axis of the worm but in a plane laterally offset from that axial plane of the worm which is perpendicular to the axis of the rock shaft opposite end thrust bearings respectively on said rock shaft and mounting, shims between said bearings, a cover for closing the aperture in said housing, a screw passing through said cover and having a threaded engagement therewith, and a spring pressed bearing block engaging a recess in the inner end of said screw and bearing against the end of said rock shaft.

HENRY MARLES.